United States Patent [19]

Perentin

[11] Patent Number: 4,844,395
[45] Date of Patent: Jul. 4, 1989

[54] SUCTION-CUP WITH A CLUTCH FLEXIBLE PIPE, FITTED TO PROP UP SOME POINTS OF SUPPORT FOR CLOTHES ON TRANSPARENT OR NOT TRANSPARENT PANELS, PARTICULARLY SUITABLE TO PREPARE SHOP-WINDOWS, SHOWS, ETC.

[75] Inventor: Alessandro Perentin, Prosecco, Italy

[73] Assignee: Easy Italy s.d.f. di Perentin Alessandro & C, Trieste, Italy

[21] Appl. No.: 113,426

[22] Filed: Oct. 23, 1987

[30] Foreign Application Priority Data

Oct. 24, 1986 [IT]  Italy ............................. 59818/86[U]

[51] Int. Cl.⁴ ............................................. A47H 1/10
[52] U.S. Cl. .............................. 248/205.8; 248/309.3; 248/362
[58] Field of Search ............... 248/205.8, 205.5, 205.6, 248/205.7, 205.9, 206.2, 363, 362, 309.3, 314; 279/3

[56] References Cited

U.S. PATENT DOCUMENTS

| | | | |
|---|---|---|---|
| 2,151,192 | 3/1939 | Crosser | 248/314 X |
| 2,784,887 | 3/1957 | Habler | 248/205.5 X |
| 2,908,467 | 10/1959 | Aberer | 248/205.8 |
| 3,011,649 | 12/1961 | Porter | 248/205.5 X |
| 3,747,170 | 7/1973 | Kieves | 248/205.8 X |
| 4,580,751 | 4/1986 | Panzer | 248/205.8 |
| 4,699,279 | 10/1987 | Spira | 248/206.2 X |

*Primary Examiner*—Ramon O. Ramirez
*Attorney, Agent, or Firm*—Browdy and Neimark

[57] ABSTRACT

A suction-cup with a flexible pipe, with two guides, parallel if required, fitted on the suction-cup itself. The flexible pipes, of suitable strength, are to be inserted in these guides. This suction-cup with a flexible pipe can be easily applied, in the most rational, lasting and safe way, on the surfaces of panels (made of any material, both transparent and non-transparent). The flexible pipes can be easily bent and shaped by hand to be eventually used as hangers or supports for garments or any other item (to be displayed in a shop-window, show, etc., or for interior decorating).

5 Claims, 4 Drawing Sheets

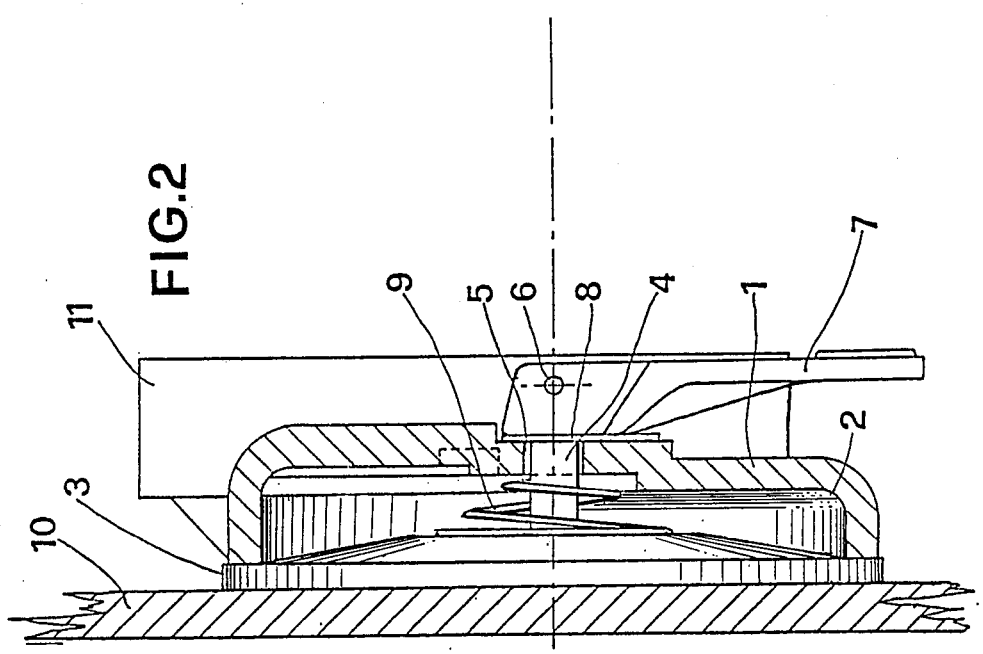
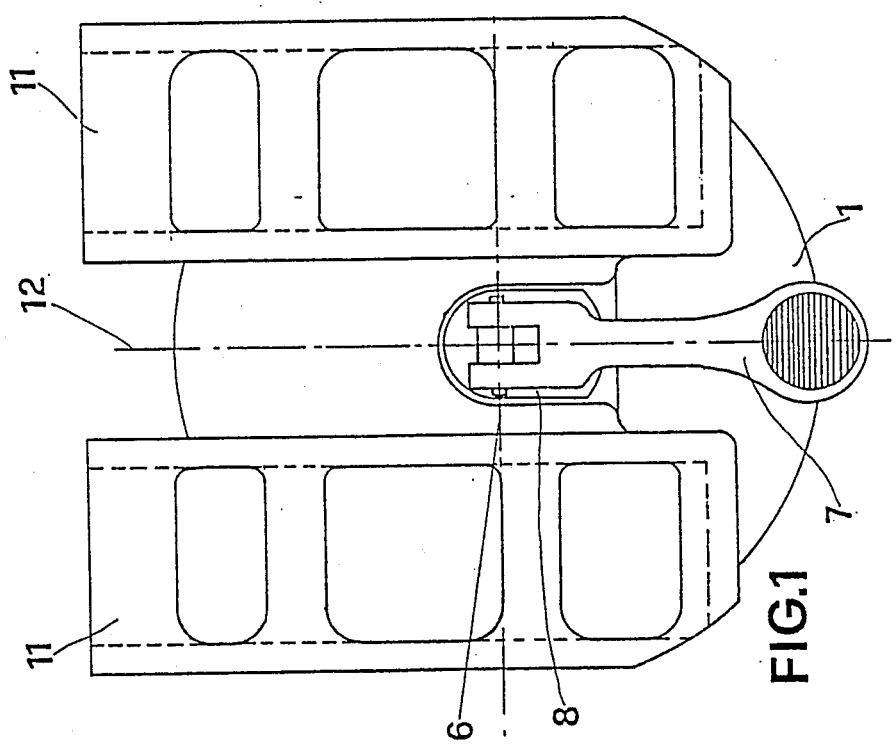

SUCTION-CUP WITH A CLUTCH FLEXIBLE PIPE, FITTED TO PROP UP SOME POINTS OF SUPPORT FOR CLOTHES ON TRANSPARENT OR NOT TRANSPARENT PANELS, PARTICULARLY SUITABLE TO PREPARE SHOP-WINDOWS, SHOWS, ETC.

BACKGROUND OF THE INVENTION

1. Field of the Invention

The subject of this invention is a suction-cup provided with a clutch flexible pipe, to support garments on transparent and non-transparent panels, specially designed for shop-windows, displays, etc.

2. The Prior Art

Emphasis should be laid on the important role played by the place where this invention will find a practical and rational use, in order to stress the original and functional use of the model itself in shop-windows, shows, etc. and interior decorating.

Shop-windows, whatever kind of shop they belong to, are the first element to come in direct contact with the prospective buyer. By observing shop-windows and the style in which clothes are arranged it is possible to assess and understand the seriousness with which the shop carries out its activity. Shop-windows are, therefore, a kind of outward projection of what can be found inside the shop, starting from the kind, quality and price of the products on sale; yet, shop-windows also send out more subtle and unconscious messages on the basis of which the observer can evaluate the quality of the service. Window-dressing in particular must aim at communicating, attracting, arousing customers' curiosity and charm and convince passers-by who are always in a hurry and increasingly inattentive, disenchanted and confused before the extremely wide range of products offered.

Consequently, shop-windows are not only a mere display of the goods to be sold, but they are like stages where imagination, creativity, artistic talent, technical and psychological skills, and rather high costs play a major role.

Window-dressing and the preparation of shows and the like is particularly important in the clothing sector (fabrics, clothes, shoes, accessories, etc.); every single individual, even the one who takes only an occasional look at shop-windows, needs on one hand to buy clothes in order to have something to wear and, on the other hand, looks for something to arouse his vanity and his pleasure to change, to find a more elegant look, to take up a social role which may be old or new.

In these sectors, the visual impact of the product is extremely important as well as an original shop-window or an attractive display inside the shop. The latter are essential for the success of the product, much more than its actual usefulness and wear.

Defining the criteria for good window-dressing is not an easy task, considering all the different situations that may arise. Therefore, it will be the window-dresser's job to find new solutions on the basis of his own experience. Taking into consideration only large-sized shop-windows, the floor and the background are the two fundamental elements. It is on these two levels that the items on sale are usually displayed, while the space in the middle of the shop-window is rarely exploited.

As the observers' attention mainly concentrates on the two above-mentioned levels, the overall result is dull and predictable, with no original solutions or catchy ideas to attract the customer's attention to a particular product. In short, there is nothing arousing the observer's interest as he is by now used to the repetitive and standardized shop-window arrangements. At the moment, the central space of the window is used by displaying dummies wearing the clothes on sale, otherwise the garments themselves, arranged as naturally as possible, are hung from the ceiling by means of threads, which are supposed to be invisible.

However, most of the time these threads are perfectly visible and the clothes often hang in a disharmonious and sagging way, far from looking natural, like a cloth hung out to dry.

SUMMARY OF THE INVENTION

The present invention has the precise purpose to extend window-dressing to the central space of the window, displaying the garments on various vertical planes, or at different angles, without any of them hiding the others, and with the possibility of arranging the clothes in a whole range of imaginative positions, with elegant drapings and turn-ups, and, most important of all, without the points of supporting being seen.

In this way, the shop-window becomes livelier, with no empty spaces, and the clothes seem to be floating in mid air. Of course, it will be up to the window-dresser's taste not to cram too many items together. He will also have to choose the most suitable lighting and mounting devices in order to create the right atmosphere and enhance some particular items.

It has to be underlined that, although it has been conceived for the display of items of clothing, fabrics, curtains, yarns, etc., the suction-cup with flexible pipe can also have a practical and rational use in the fitting out of shops selling a totally different kind of products, or in shows, trade-fair stands, art galleries, interior decorating, etc.

It can also be used in interiors to create original hangers, to match modern furniture following innovative criteria.

More in particular, the suction-cup with a clutch flexible pipe is made up of a common, highly adhesive suction-cup; the suction-cup casing is of particular interest as it is provided with two external parallel, or not parallel, guides which can have rectangular, square or any other sections.

A plastically adjustable flexible pipe - made up, for example, of a plastic pipe, of the required diameter, with finished ends and a metal core (e.g., galvanized iron, lead, etc.) which can maintain the shape given to it for an indefinite time, even under a weight. The pipe is threaded through one or both of the above-mentioned guides, even bent and U-shaped.

Of course, the weight to be applied to the pipe will have to be limited, like an item of clothing for example, including heavier garments such as coats, jackets, fur coast, etc.

The suction-cups with clutch flexible pipes can be applied on rough or smooth panel surfaces (suitably shaped), which can be transparent or non-transparent, previously installed in the shop-window or stand, to the window-dresser's taste. Once the suction-cups have been fitted, the garments can be hung on the flexible pipes, making sure that the items completely cover the suction-cups and relevant pipes; it will be the window-dresser's job to shape the flexible pipes as required to put the garments in the correct position. As the above-mentioned flexible pipe is free at both ends, a wide range of positions are made possible. Furthermore, single elements of the garments can be shaped by means of the suction-cups, such as the sleeves of jackets, coats, raincoats, shirts, etc., once again without these hanging device being seen.

The same solution of plastically shaped displays can also be applied to trousers, skirts, cloaks, drapings and the like. For a successful result, the choice of the right panels is important, as the suction-cups will be fitted on their surfaces; their position, size, shape and material have to be coordinated to obtain the final result required. The choice ranges include transparent materials (such as various translucent materials, etc.) or decorated or metallic materials.

BRIEF DESCRIPTION OF THE DRAWINGS

The invention will be better understood by following the description and the drawings enclosed, providing a practical example of the device which can be manufactured with any material, shape, size and color, in which:

FIG. 1 shows, in an orthographic projection, the suction-cup seen from the side of the two guides supporting the flexible pipe;

FIG. 2 shows a cross-section of the suction-cup side;

DETAIL DESCRIPTION OF THE PREFERRED EMBODIMENT

Figure 3:
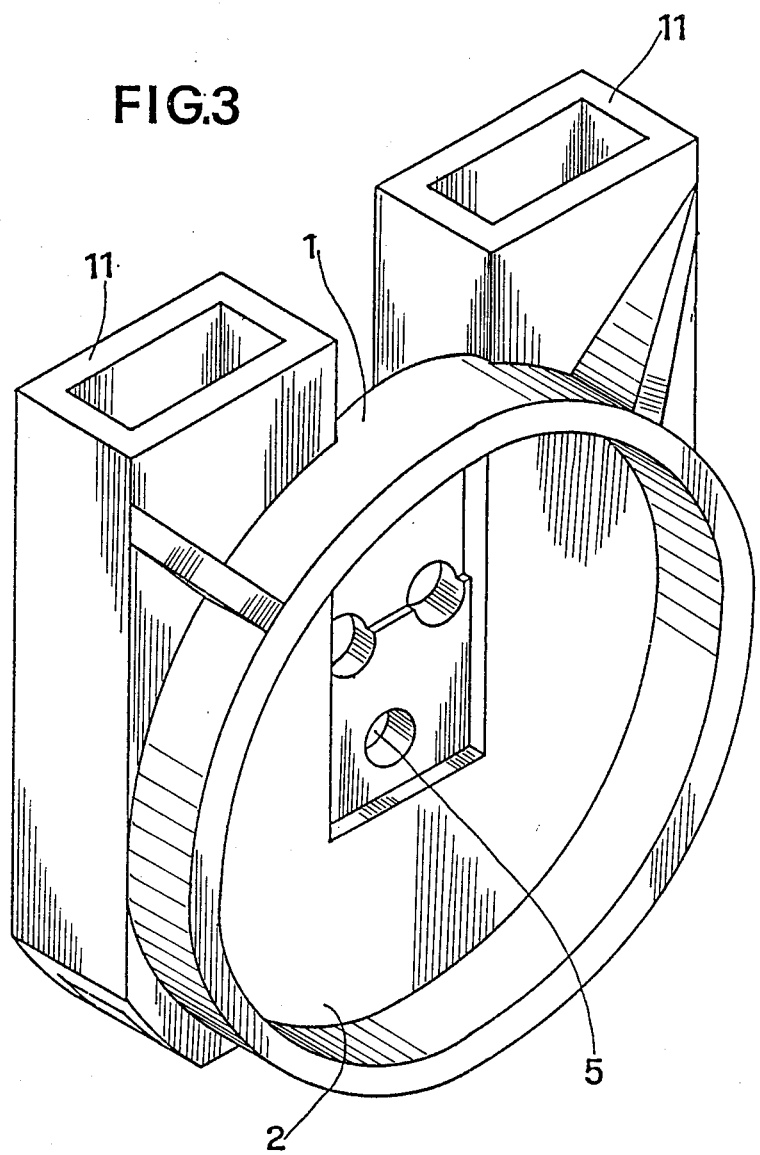
FIG. 3 shows, in isometric drawing, the supporting element for the two guides.
Figure 4:
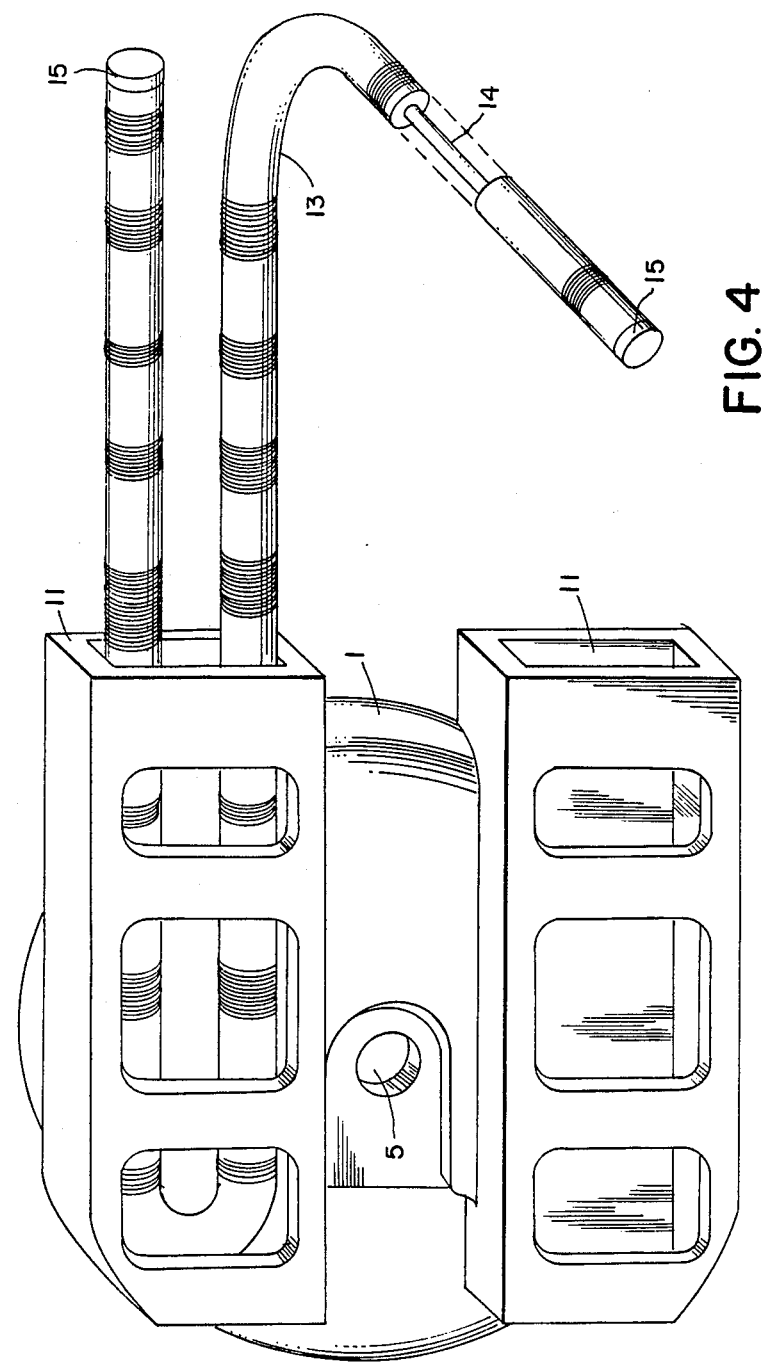
FIG. 4 shows how the flexible pipe is to be inserted into its guide.
Figure 5:
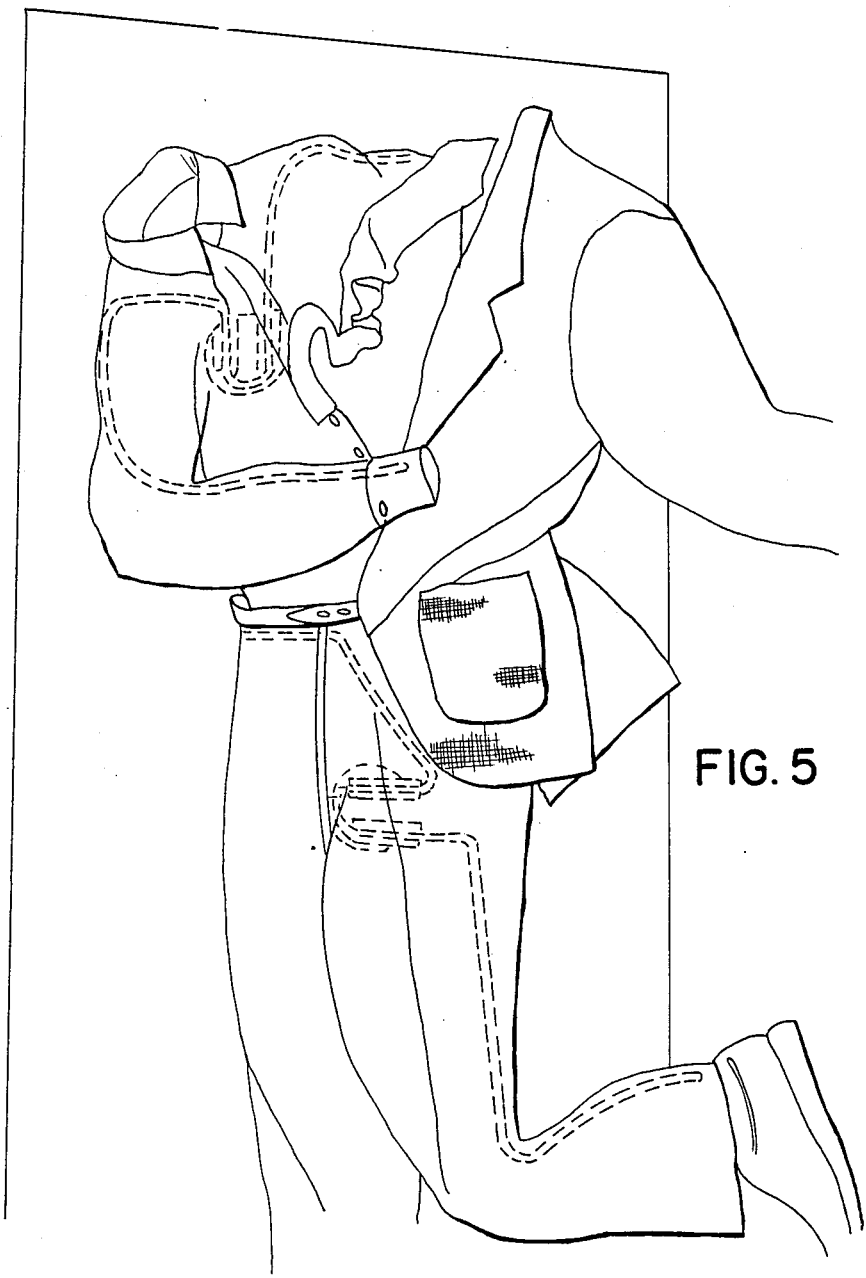
FIG. 5 effectively illustrates an example of window-dressing by means of the suction-cup with clutch flexible pipe (totally invisible), applied to a vertical plate glass panel which supports and gives movement to some items of clothing.

The invention is made up of a circular, cup-shaped supporting element 1 forming a space 2 where membrane 3 of the suction-cup is fitted.

Membrane 3 is provided with a rod 4, passing through hole 5, placed on supporting element 1, where the cam lever 7 is hinged on axis 6. A grommet 8 is placed between cam lever 7 and the outside face of supporting element 1, to avoid the wear of the face itself during the manual operation of cam lever 7.

A return spring 9 is placed between membrane 3 and the inside face of space 2.

By resting membrane 3 on the surface of panel 10 and manually rotating cam lever 7, the automatic adhesion of the whole suction-cup to panel 10 will be achieved.

The grip is firm and will last for longer periods of time than are required for exhibitions.

Supporting element 1 is provided with two hollow guides 11, with a parallelepiped-shaped, which are parallel and aligned with longitudinal axis 12 of cam lever 7.

Flexible pipes 13 are inserted into these guides. The pipes can be easily bent and shaped by the window-dresser who will then hang and arrange the garments or other items on them as required.

As flexible pipes 13 are extremely easy to bend, they can be shaped again for the final touches even when the garments have already been displayed.

Flexible pipes 13 have metal cores 14 which make them strong enough to support the weight of the clothes hung on them.

The ends of each flexible pipe 13 are closed with plugs 15, to prevent the metal cores 14 from slipping out.

I claim:

1. A suction-cup assembly for supporting items on transparent and non-transparent panels, specially designed for shop-windows, exhibitions, etc., comprising:
   a supporting element;
   at least one flexible pipe on which the items to be displayed will be hung, said flexible pipes comprising an outer covering, an inner bendable metal core disposed in said outer covering for supporting the weight of items hung thereon, and a plug disposed on the ends of said pipes for preventing said metal core from slipping out; and
   at least one guide mounted on said supporting element for receiving said at least one flexible pipe.

2. The suction-cup assembly according to claim 1, further comprising:
   a membrane placed on said supporting element;
   a cam lever for easy and rapid adhesion and release of said suction-cup assembly from a panel surface.

3. The suction-cup assembly according to claim 1, wherein said at least one flexible pipe comprises two flexible pipes and said at least one guide comprises:
   two parallelepiped-shaped guides, which are hollow and large enough to make possible the insertion of said at least one flexible pipes.

4. The suction-cup assembly according to claim 3, wherein each of said flexible pipes are bent, each end towards the other to be inserted into said guides.

5. The suction-cup assembly according to claim 1, wherein the items to be hung are garments.

* * * * *